United States Patent
Lawson et al.

(10) Patent No.: US 9,828,062 B2
(45) Date of Patent: Nov. 28, 2017

(54) ALL WHEEL DRIVE MOTORCYCLE WITH ENHANCED SOFT TERRAIN CAPABILITIES

(71) Applicants: Martin E. Lawson, Somerset, WI (US); William E. Lawson, Somerset, WI (US)

(72) Inventors: Martin E. Lawson, Somerset, WI (US); William E. Lawson, Somerset, WI (US)

( * ) Notice: Subject to any disclaimer, the term of this patent is extended or adjusted under 35 U.S.C. 154(b) by 0 days.

(21) Appl. No.: 14/245,420

(22) Filed: Apr. 4, 2014

(65) Prior Publication Data

US 2014/0299400 A1 Oct. 9, 2014

Related U.S. Application Data

(60) Provisional application No. 61/808,862, filed on Apr. 5, 2013.

(51) Int. Cl.
*B62M 23/00* (2006.01)
*B62K 11/00* (2006.01)

(52) U.S. Cl.
CPC .......... *B62M 23/00* (2013.01); *B62K 11/00* (2013.01)

(58) Field of Classification Search
CPC .... B60K 17/35; B60K 17/352; B60K 17/356; B60K 17/348; B60K 17/3505
See application file for complete search history.

(56) References Cited

U.S. PATENT DOCUMENTS

| | | | |
|---|---|---|---|
| 3,045,772 A | 2/1959 | Nicolai | |
| 3,268,025 A | 8/1966 | Fehn | |
| 3,642,083 A * | 2/1972 | Rodler, Jr. | B62K 11/00 180/224 |
| 3,746,113 A | 7/1973 | Tidwell | |
| 4,702,340 A | 10/1987 | Hamilton | |
| 5,054,572 A | 10/1991 | Parker | |
| 5,113,964 A | 5/1992 | Yamauchi | |
| 5,484,893 A | 1/1996 | Parker et al. | |
| 5,782,313 A | 7/1998 | Kurawaki et al. | |
| 6,182,991 B1 | 2/2001 | Christini et al. | |
| 7,487,854 B2 * | 2/2009 | Christini | B62K 25/08 180/223 |

(Continued)

FOREIGN PATENT DOCUMENTS

| RU | 2087368 C1 | 8/1997 |
|---|---|---|
| WO | 8809739 A1 | 12/1988 |

OTHER PUBLICATIONS

The International Search Report and Written Opinion dated Aug. 14, 2014 for corresponding International Application No. PCT/US2014/033002, filed Apr. 4, 2014.

*Primary Examiner* — Anne Marie M Boehler
*Assistant Examiner* — Felicia L. Brittman
(74) *Attorney, Agent, or Firm* — Peter J. Ims; Westman, Champlin & Koehler, P.A.

(57) ABSTRACT

A motorcycle includes a front wheel drive train that supplies power to a front wheel and a rear wheel drive train that supplies power to a rear wheel. The front wheel drive train is configured to drive the front wheel at a selected rate that is faster than a rate at which the rear wheel drive train drives the rear wheel. Driving the front wheel at the selected faster rate relative to the rear wheel provides enhanced steering capabilities in soft terrain, as the front wheel pulls the motorcycle in a direction that the front wheel is pointed.

20 Claims, 10 Drawing Sheets

(56) References Cited

U.S. PATENT DOCUMENTS

| | | |
|---|---|---|
| 7,775,314 B2 * | 8/2010 | Blais .................... B62K 25/16 180/224 |
| 8,042,641 B2 | 10/2011 | Lawson |
| 8,225,897 B1 | 7/2012 | Hollingsworth |
| 2005/0173176 A1 | 8/2005 | Christini et al. |
| 2008/0100027 A1 | 5/2008 | Christini et al. |

* cited by examiner

ALL WHEEL DRIVE MOTORCYCLE WITH ENHANCED SOFT TERRAIN CAPABILITIES

CROSS-REFERENCE TO RELATED APPLICATION

The present application claims the benefit of U.S. Provisional Patent Application Ser. No. 61/808,862 that was filed on Apr. 5, 2013, the contents of which are incorporated by reference in its entirety.

BACKGROUND

The present disclosure relates to an all wheel drive motorcycle. More particularly, the present disclosure relates to an all wheel drive motorcycle a front wheel drive train that provides enhanced soft terrain riding capabilities.

Many people enjoy riding motorcycles on the road as well as off road. One class of motorcycle is an adventure motorcycle, which is designed to travel over both hard, high traction surfaces or roads as well as soft and/or uneven terrain.

When driving a motorcycle off road, the motorcycle can encounter rough terrain, obstacles or soft soil conditions, such as sand and gravel. When driving a motorcycle on soft terrain, such as sand or gravel, cornering or turning the motorcycle can be difficult. If the angle of the front wheel relative to the direction of travel becomes too great, the front wheel has a tendency of plowing in the soft terrain. What is meant by plowing is that the front wheel is positioned to move at an angle to the direction of travel and the motorcycle continues in the current direction of travel in spite of the angle of the wheel. Having a front wheel plow in soft terrain can be hazardous to the rider because of the instability that is created.

One way to maintain control of a motorcycle while riding off road is to provide a drive force to the front wheel. Providing a driving force to the front wheel also aids in steering the motorcycle in soft terrain. The driving force to the front wheel can pull the motorcycle through the soft terrain, which in turn can prevent the front wheel from plowing.

A potential issue is that as a front wheel of an all wheel drive motorcycle is turned or cornered, a torque steer is typically created which can impart instability to the motorcycle. However, the front wheel drive system can be designed to essentially eliminate torque steer. Once such front wheel drive system is disclosed in Lawson U.S. Pat. No. 8,042,641, the contents of which are incorporated herein by reference.

While it can be beneficial to provide a driving force to the front wheel in some instances, especially when travelling in soft or uneven terrain, there are also instances when it would be beneficial for the front wheel to be able to free wheel, such as when driving on a high traction surface, such as a paved road. What is meant by free wheeling is that the wheel rotates without any drive force being imparted on the wheel. Providing power to the front wheel while driving on high traction surfaces, such as a road, tends to provide feedback to the rider through the handlebars while riding, which can make the steering of the motorcycle somewhat unstable.

SUMMARY

The present disclosure relates to a motorcycle having a front wheel drive train that supplies power to a front wheel and a rear wheel drive train that supplies power to a rear wheel. The front wheel drive train is configured to drive the front wheel at a selected rate that is faster than a rate at which the rear wheel drive train drives the rear wheel. Driving the front wheel at the selected faster rate relative to the rear wheel provides enhanced steering capabilities in soft terrain, as the front wheel pulls the motorcycle in a direction that the front wheel is pointed.

The present disclosure relates to a motorcycle having a front wheel drive train that is selectably engaged to drive a front wheel at a faster rate than the rate that a rear wheel drive train supplies power to the rear or back wheel to provide enhanced steering capabilities in soft terrain. The front wheel drive train can be selectably disengaged such that the motorcycle can be used in a rear wheel drive mode where the front wheel is free wheeling. A device in the front wheel drive train is manipulated to enable and disable the front wheel drive train to the front wheel. With the device in the engaged position, the front wheel drives at a selected range percentage faster than the back wheel so that the motorcycle is pulling in the direction that the wheel is pointed. The front wheel drive train also includes a slip clutch that allows for slippage of the front wheel drive train to the front wheel when utilizing the motorcycle in the all wheel drive mode on a high traction or hard surfaces such that the front wheel provides sufficient power to the front wheel while not significantly affecting the steering capability of the motorcycle.

The present disclosure also relates to a motorcycle having first and second front wheel drive trains that configured to provide power to a front wheel with the first front wheel drive train, the second front wheel drive or to disable the first and second front wheel drive trains such that the front wheel is able to free wheel. The first front wheel drive train is configured to provide power to the front wheel such that a rate of rotation of the front wheel is in a selected range slightly less than a rate of rotation of a back wheel, such that when any slippage of the back wheel occurs, the front wheel drive engages, which can enhance the steering of a motorcycle on surfaces such as a gravel road. The second front wheel drive train is configured to provide power to the front wheel such that a rate of rotation of the front wheel is in a selected range greater than a rate of rotation of the rear or back wheel, which can enhance the steering of a motorcycle in soft terrain, such as sand, loose gravel, loose dirt and mud. The first and second front wheel drive trains can be disengaged to allow the front wheel to free wheel on hard, high traction surfaces such as an asphalt road.

The present disclosure relates to a motorcycle having a front wheel drive train that supplies power to a front wheel and a rear wheel drive train that supplies power to a rear wheel. The front wheel drive train is configured to drive the front wheel with a variable speed drive that can be manipulated to provide power to the front wheel at a selected rate ranging between slower than to faster than a rate at which the rear wheel drive train drives the rear wheel. A sensor can optionally detect an angle of the front wheel where the sensor is configured to send a signal to the variable speed drive in the front wheel drive train to adjust the rate of the rotational speed of the front wheel relative to the back or rear wheel depending upon the conditions experienced by the motorcycle.

DETAILED DESCRIPTION

Figure 1:
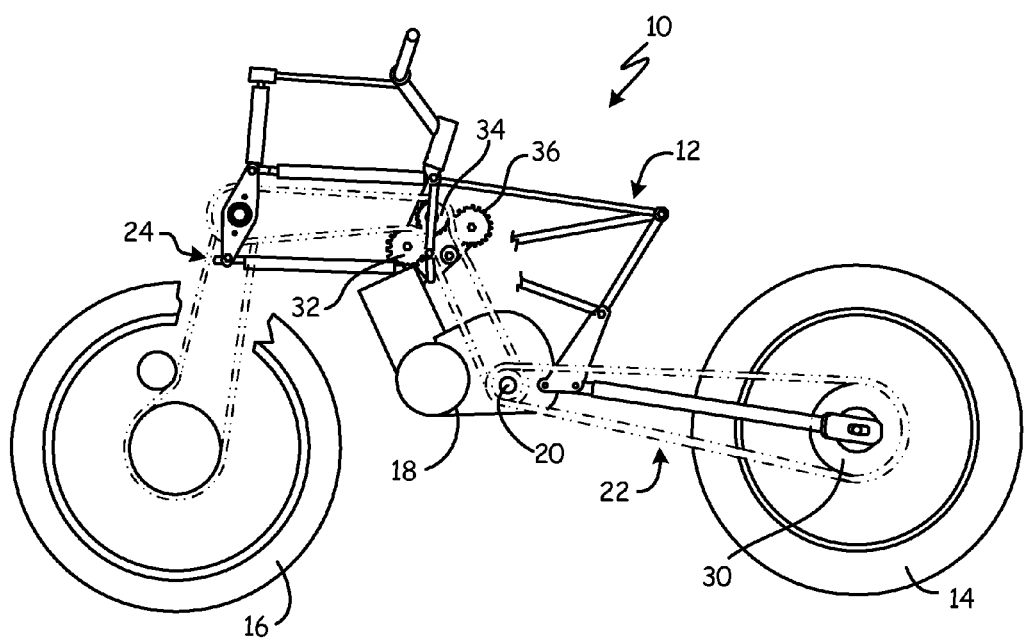
FIG. 1 is a schematic view of an all wheel drive motorcycle.

A motorcycle is schematically illustrated in FIG. 1 at 10. The motorcycle 10 includes a frame 12 that supports a prime mover 18, a rear or back wheel 14 and a front wheel 16. An output shaft 20 extends from the prime mover 18 where the output shaft 20 provides power to the back wheel 14 through a back wheel drive train 22. The output shaft 20 provides power to a front wheel drive train 24 that selectively provides power to the front wheel 16 where the rider controls whether to provide power to the front wheel 16 by manipulating a clutch 50 located within the front wheel drive train 24. The prime mover 18 can be an internal combustion engine or an electric motor.

Figure 2:
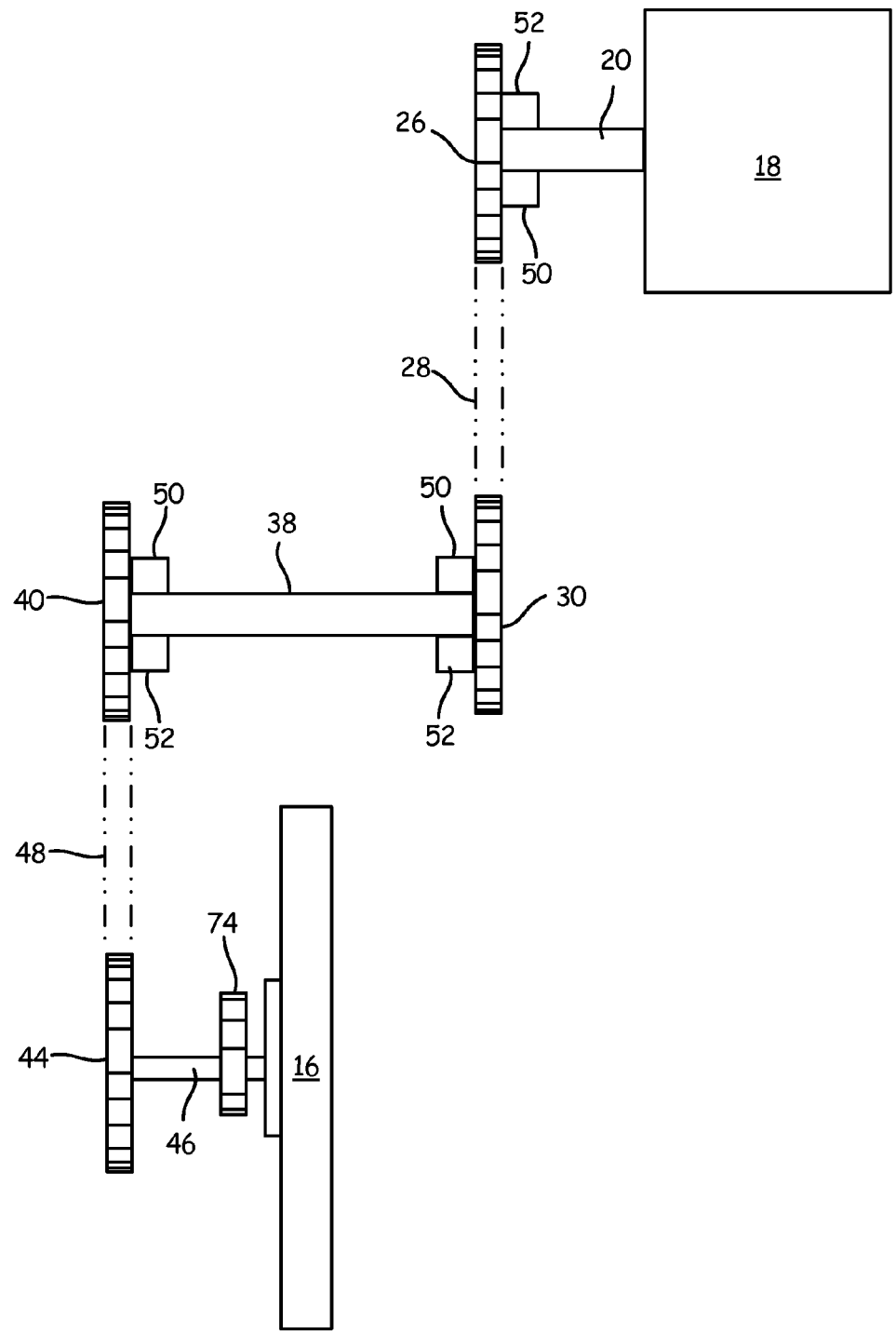
FIG. 2 is a schematic view of a chain operated front wheel drive train of the present disclosure.

Referring to FIGS. 1 and 2, a front wheel drive train 24 that utilizes a plurality to chains is illustrated. The front wheel drive train 24 receives power from the prime mover 18 that is coupled the output shaft 20. A sprocket 26 is coupled to the output shaft 24.

A portion of a continuous chain 28 engages the sprocket 26 and also engages a left front sprocket 30 that is typically located on a left hand side of the motorcycle 10 proximate a steering mechanism. Idling sprockets 32 and 34 as well as a tensioning sprocket 36 may be utilized to direct a path of the chain 28, as best illustrated in FIG. 1. However, other paths of the chain 28 and configuration of the sprockets 32, 34 and 36 are also contemplated, including having a direct path from the sprocket 26 to the left front sprocket 39 which would not require the idling sprockets 32 and 34.

Figure 3:
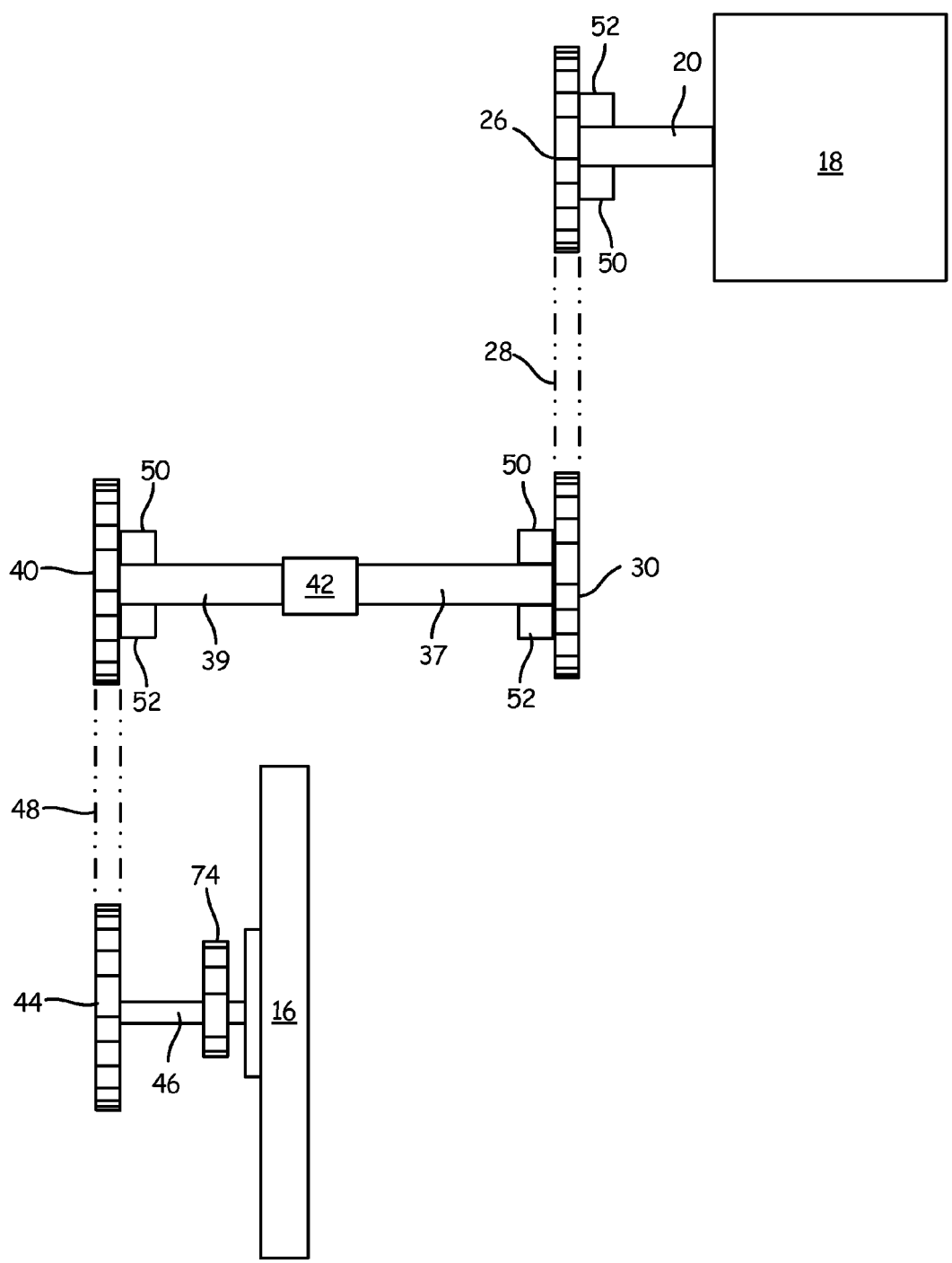
FIG. 3 is a schematic view of another chain operated front wheel drive train of the present disclosure.

Referring back to FIG. 2, a shaft 38 couples the left front sprocket 30 to a right front sprocket 40 where the right front sprocket 40 is located on a right hand side of the motorcycle 10 proximate the steering mechanism. Referring to FIG. 3, it is also contemplated to include a universal joint 42 between two stub shafts 37 and 39 proximate the axis of rotation of the steering mechanism to minimize or eliminate torque steer as disclosed in U.S. Pat. No. 8,042,641, the contents of which were previously incorporated herein by reference.

Referring to FIGS. 2 and 3, the right front sprocket 40 is coupled to a drive wheel sprocket 44 with a continuous chain 48. The drive wheel sprocket 44 is coupled to a hub 46 that carries the front axle for the front wheel 16.

Therefore, when the front power train 24 is engaged, power is transferred from the prime mover 18 to the front wheel 16 through the sprocket 26 to the chain 28 and into the left front sprocket 30. Power is then transferred from the left front sprocket 30 to the right front sprocket 40 with a shaft 38 or the stub shafts 37 and 39 coupled by the universal joint 42. Power is then provided to the front wheel 16 with power being transferred from the right front sprocket 40 to the drive wheel sprocket 44 with the continuous chain 48.

The all wheel drive capabilities of the motorcycle 10 can be useful when riding on uneven or soft terrain. However, when driving the motorcycle 10 on high traction surfaces, in overdrive mode such as an asphalt or concrete road, feedback is provided to the steering that can make the all wheel drive motorcycle somewhat harder to steer.

The present disclosure includes the clutch 50 located within the front wheel drive train 24 to allow the rider to switch between a rear wheel drive mode for use on high traction surfaces and an all wheel drive mode for use on uneven or soft terrain. However, the motorcycle can be maintained in the all wheel drive move. The clutch 50 in the front wheel drive train 24 can be located in any of a number of locations 52 as illustrated in FIGS. 2 and 3. The clutch is configured to be manipulated between a disengaged position such that the motorcycle 10 is in the rear wheel drive mode where the front wheel 16 is free wheeling and the front wheel drive train 24 does not supply power to the front wheel 16. The driver would typically utilize the motorcycle 10 in the rear wheel drive mode when maneuvering the motorcycle on a high traction surface such as a paved road.

When the driver encounters soft or rough terrain, the motorcycle 10 can be placed into the all wheel drive mode by engaging the clutch 50 in the front wheel drive train 24. When the front wheel drive train 24 is engaged the speed of the front wheel 16 relative to the speed of the back wheel 14 is a set at a percentage range greater than the speed of the back wheel 14. With the speed of the front wheel 16 being greater than the speed of the back wheel 14, the front wheel 16 is referred to as having an overdrive. A range of overdrive of the front wheel 16 relative to the back wheel is typically between about 3% and about 8% and more typically between about 5% and about 7%. The overdrive to the front wheel 16 can be accomplished by utilizing selected gearing in the front wheel drive train 24, whether utilizing a chain drive or a shaft drive.

In some instances, the percentage of the overdrive of the front wheel 16 relative to the rear wheel can be up to about 40%. In particular when having to make sharp turns, such as for instance, turning the front wheel at an angle of about 45 degrees relative to the direction of travel of the motorcycle 10 on loose terrain, the overdrive of up to 40% may be required to maintain the speed of the front wheel 16 in a range of between about 1% and about 10% greater than a synchronous speed of the front wheel 16 and the back wheel 14. More particularly, the speed of the front wheel 16 is contemplated to be maintained about 3% and about 5% greater than the synchronous speed of the front wheel 16 and the rear wheel 14.

Utilizing the overdrive on the front wheel 16 relative to the back wheel 14 causes the front wheel 16 to always be substantially pulling the motorcycle 10 in the direction that the front wheel 16 is pointed. In soft terrain, such as sand or mud, supplying power to the front wheel 16 with a selected overdrive relative to the back wheel 14 allows the motorcycle 10 to be steered and prevents the front wheel 16 from plowing in the soft terrain. Due to the amount of slippage caused by the soft terrain, the overdrive of between about 3% and about 8% of the front wheel 16 relative to the back wheel 14 allows for responsive steering of the motorcycle 10.

When utilizing the motorcycle 10 in the all wheel drive mode with the overdrive to the front wheel 16 on a high traction or hard surface, it has been found that there is a feed back to the steering. The feedback is caused by the front wheel 16 wanting to move at the lowest energy input where the back and front wheels 14 and 16 are moving synchronously with the ground. Therefore, the front wheel 16 tends to want to be at a steering angle where the radii of the curvature of the front wheel path for the front wheel 16 is the same percentage as the front wheel overdrive percentage relative to the radii of curvature of the path of the back wheel 14. As such, the front wheel 16 tends to want to move from the vector of travel of the motorcycle when the overdrive on the front wheel 16 is utilized on hard or high traction surface. This effect can be easily overcome by the rider however it detracts from the ease of steering the motorcycle.

The clutch 50 is utilized to easily switch from the all wheel drive mode with the overdrive to the front wheel 16 to the rear wheel drive mode, which eliminates the issue of feedback caused by the overdrive. The capability to easily switch between the two modes is beneficial when traveling over both hard, high traction surfaces and soft surfaces, such as when utilizing an adventure type motorcycle.

Figure 4:
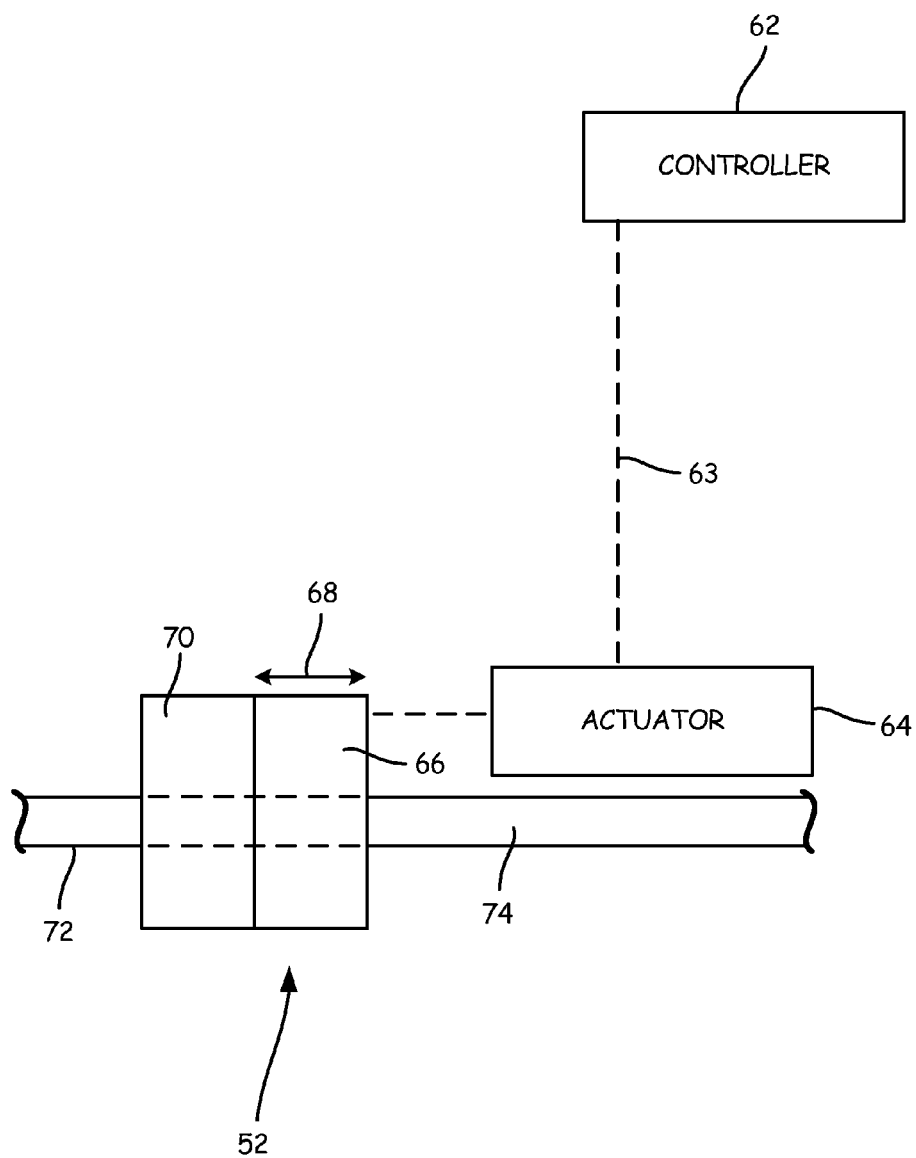
FIG. 4 is a schematic view of a front wheel and hub with a slip clutch.
Figure 5:
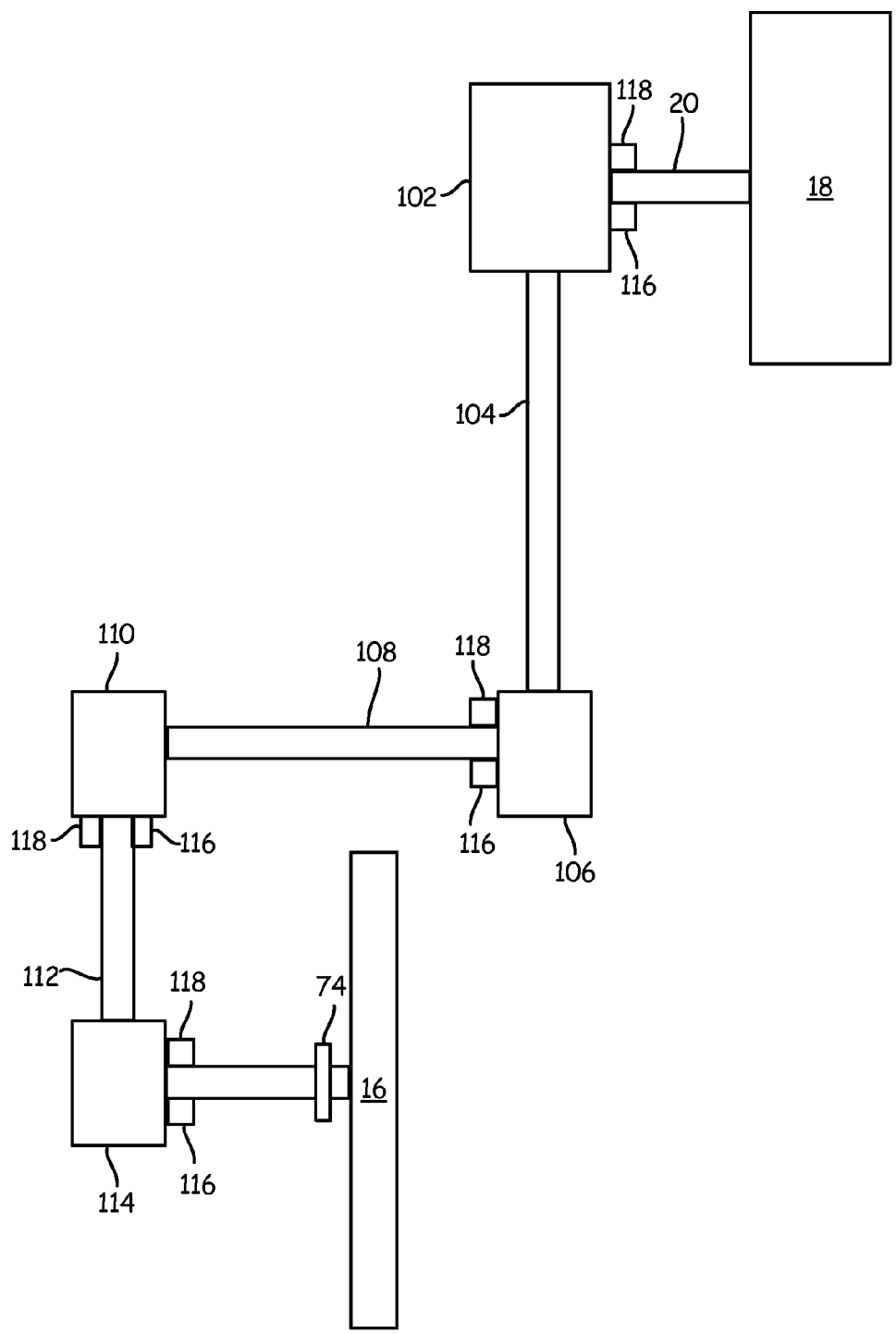
FIG. 5 is a schematic view of a shaft operated front wheel drive train of the present disclosure.

Referring to FIG. 4, the clutch 50 can be any suitable clutch capable of engaging and disengaging the front wheel power train 24 including a manually operated clutch that is manipulated when the motorcycle is at a stop or a clutch that can be engaged or disengaged on the fly. It is contemplated that clutch could be an electrically actuated slip clutch or an electromagnetic powder clutch, or any other suitable clutch, including a variable torque clutch that allows the driver to match the power delivered by front wheel power train 24 to the front wheel 16 to the conditions.

It is contemplated that a position of the clutch 50 can be manipulated from an engaged position to a disengaged position and back by a controller 62 that is located at a convenient location for the driver, such as on the handlebars. The controller 62 provides a signal 63 to an electric powered actuator 64 that moves a pressure plate or a lateral moving portion 66 in a direction of arrows 68 relative to clutch plate or a non-lateral moving portion 70.

When in the disengaged position, power from a shaft 72 is not transferred to a shaft 74 and thereby allows the front wheel to free wheel. When in the engaged position as illustrated in FIG. 4, power is transferred from the shaft 72 to the shaft 74 and power is supplied to the front wheel 16 through the front wheel drive train.

In the instance where the clutch 50 is electrically controlled, the clutch is configured to be manipulated to the engaged position from the disengaged position and vice versa either when the motorcycle is stopped or moving. The front drive train 24 can therefore be engaged or disengaged on the fly or at a stop.

Referring back to FIGS. 2 and 3, the front wheel drive train 24 also includes an overrunning clutch 74 that allows the front wheel 16 to free wheel when the front wheel 16 is turned more than the maximum synchronous steering angle of the front wheel 16 relative to the back wheel 14. Allowing the front wheel 16 to free wheel when turned more than the maximum synchronous steering angle, provides stability to the motorcycle 10 and prevents the front and back wheels 16 and 14 from interfering with each other when making sharp turns.

Referring to FIGS. and 5, a shaft driven front wheel drive train 100 is illustrated that utilizes a plurality of shafts and gear boxes to provide power to the front wheel 16 from the output shaft 20 of the prime mover 18. A gear is coupled to the output shaft 20 in a gear box 102 which meshes with another gear within the gear box 102. Power is provided to the shaft 104 from the gear box 102 where the shaft 104 provides power towards the front end of the motorcycle 10.

A gear on another end of the shaft 104 is positioned within a gear box 106 where the gear on the end of the shaft 104 meshes with another gear attached to a shaft 108 that delivers power from the left side of the motorcycle to a right side of the motorcycle. A gear is coupled to the shaft 108 and is positioned within another gear box 110 that meshes with another gear that is coupled to a front wheel shaft 112. The front wheel shaft 112 provides power to the front wheel 16 through a gear box 114.

Similar to the embodiment illustrated in FIG. 2, the front wheel drive train 100 can include at least one clutch 116 that can be located at any of a number of locations 118 within the front wheel drive train 100. The clutch 116 is positionable between a disengaged position where the front wheel drive train 100 does not supply power to the front wheel 16, such that the front wheel 16 is free wheeling. When the clutch 116 is located in the engaged position power is supplied to the front wheel 16 through the drive train 100 such that an overdrive is provided to the front wheel 16 relative to the back or rear wheel 14. The overdrive is provided through the selection and sizing of the gears in any of the gear boxes.

The front wheel drive system can also include the overrunning clutch 74 that allows the front wheel 16 to free wheel when the front wheel 16 is turned more than the maximum synchronous steering angle of the front wheel 16 relative to the back wheel 14.

Figure 6:
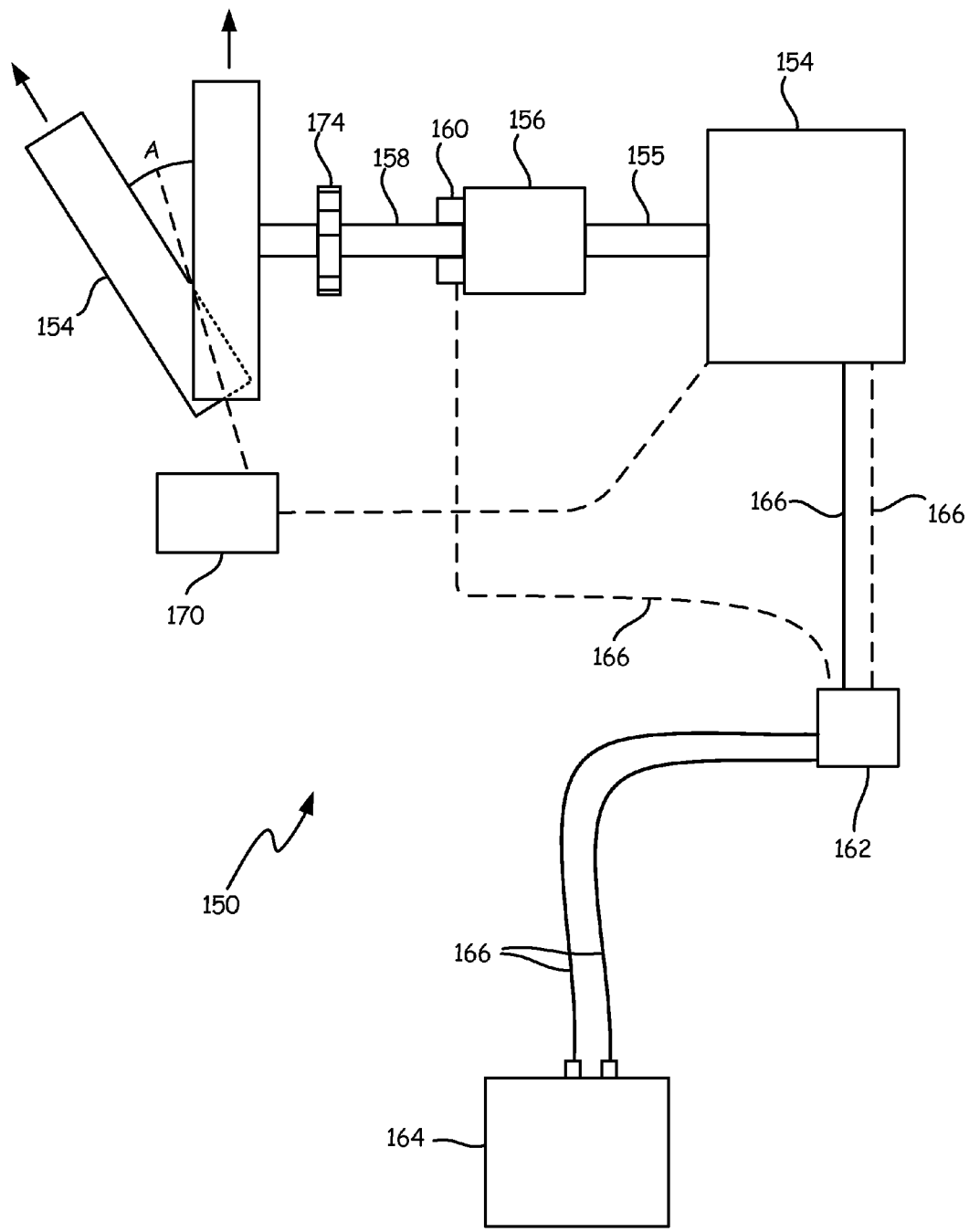
FIG. 6 is a schematic view of a front wheel drive train of the present disclosure powered with an electric motor.

Referring to FIG. 6, another embodiment of a front wheel drive train 150 for a motorcycle is illustrated. The front wheel drive train 150 provides power to a front wheel 152 through an output shaft 155 of electric motor 154 that is coupled to a gear box 156. An output 158 of the gearbox 160 is coupled to the front wheel 152 to provide power to the front wheel 152.

The electric motor 154 can be a single speed or a variable speed motor that is capable of adjusting the speed of the output shaft 155 such that the rate of rotation of the front wheel 152 is overdriven relative to a rate of rotation of a back wheel 14, as illustrated in FIG. 1. A range of overdrive of the front wheel 152 relative to the back wheel 14 is typically between about 3% and about 8% and more typically between about 5% and about 7%. Utilizing an overdrive provides enhanced steering capabilities in soft terrain, such as sand and/or mud.

The variable speed electric motor 154 is capable of adjusting the speed of the output shaft 155 such that the front wheel 152 is underdriven relative to a rate of rotation of a back wheel 14. What is meant by underdriven is when power is supplied to the front wheel to provide a rotational speed that is less than the rotational speed of the rear wheel, typical in a range of about 1% to about 5%. Providing power to the front wheel 152 with an underdrive relative to the rotational speed of the rear or back wheel 14 provides enhanced steering in terrain that has less than ideal traction that causes the back wheel 14 to slip which will then cause the front wheel 104 to provide power to the motorcycle, such as when travelling on a gravel road. An overrunning clutch 174 is typically provided between the front wheel 152 and the output 158 from the gearbox 156 to allow the front wheel 152 to free wheel when the power is not required while driving with an underdrive.

It is also contemplated that the front wheel drive train 150 can be disengaged to allow the front wheel 152 to freewheel, which can be beneficial when riding on high traction, hard surfaces, such as a paved road. The front wheel drive train 150 includes a clutch 166 that can be engaged to provide the overdrive or underdrive or can be disengaged to allow the front wheel 152 to free wheel.

A switch 162, which can be mounted in any location on the motorcycle, and typically the handle bars can be manipulated to configure the front wheel drive train 150 to provide an overdrive, an underdrive by manipulating the speed of the motor 154 or no power to the front wheel 152 by manipulating the clutch 166.

Power is supplied to the electric motor 154 from a battery 164, supported by the motorcycle frame, with wiring 166. It is contemplated that a fuse (not shown) be included in the circuitry to protect both the switch and the electric motor 154 in the event of a failure of the battery 164.

It is also contemplated that the variable speed electric motor 154 be coupled to a sensor 170 attached to the motorcycle where the sensor 170 detects or senses an angle A of the front wheel 152 relative a direction of travel and sends a signal to the electric motor 154 which causes the power and speed to the front wheel 152 to be increased or decreased depending on the sensed angle. The sensor 170 thereby provides feedback control to optimize the efficiency of the enhancement for driving in soft terrain.

It is contemplated that the feedback control provided by sending a signal to from the sensor to the variable speed motor 154 (or any other variable speed device as discussed below) may be utilized to maintain a constant selected percent underdrive of the front wheel relative to the rear wheel relative a synchronous speed of the front and rear wheels. For instance, if a motorcycle is turned at about 12.5 foot radius with a 64 inch wheel base at slow speeds, the bike is mostly upright and requires the front wheel go 10.2% faster than the rear wheel to be at synchronous speed. Maintain a constant underdrive, even when turning, especially if the underdrive is close to 0%, can be very beneficial on slippery surfaces such as, for instance, mud where excessive over drive and or underdrive would result in the wheel slipping.

Figure 7:
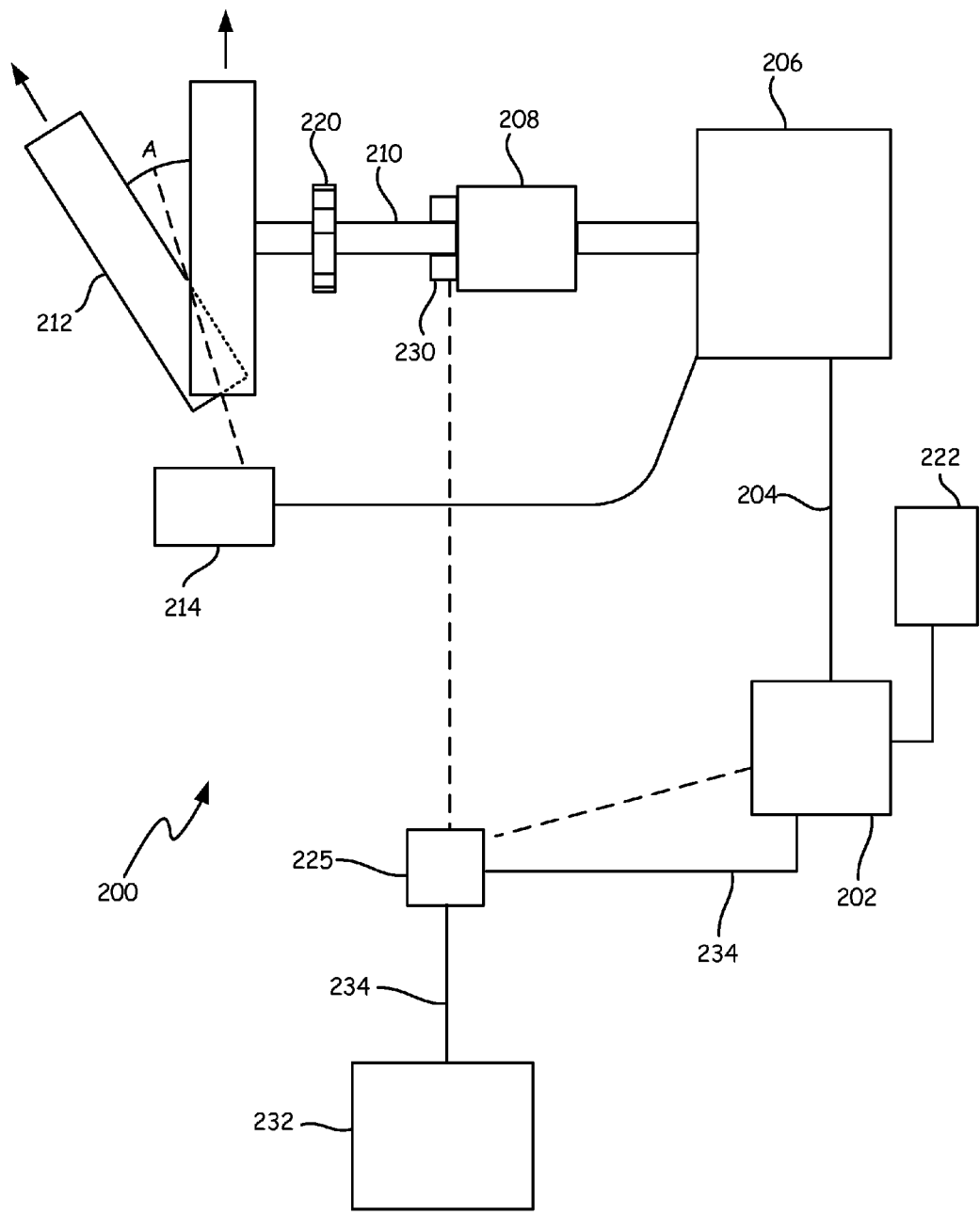
FIG. 7 is a schematic view of a front wheel drive train of the present disclosure powered with a hydraulic pump.

Referring to FIG. 7, a schematic view of a hydraulic powered front wheel drive train 200 is illustrated. The front wheel drive train 200 include a hydraulic pump 202, that may be a constant speed or variable speed pump, and pumps hydraulic fluid through a high pressure line 204 to a hydraulic drive 206 that is mechanically coupled to a gear box 208 where an output 210 of the gear box 208 is coupled a front wheel 212.

The front wheel drive train 200 can be continuously coupled to the front wheel 212 to provide a continuous overdrive to the front wheel 212 relative to the back wheel 14 in the ranges previously disclosed. The front wheel drive train 200 can also provide an underdrive to the front wheel 212 relative to the back wheel 14 in the ranges as previously disclosed. When an underdrive is utilized, an overrunning clutch 220 located with between the gear box 208 and the front wheel 212 can be utilized to allow the front wheel 212 to free wheel unless there is excess slippage of the back wheel 14.

It is also contemplated that the variable speed hydraulic pump 202 can be electrically coupled to a sensor 214 attached to the motorcycle where the sensor 214 detects or senses an angle A of the front wheel 212 relative a direction of travel and sends a signal to the hydraulic pump 202. The speed of the pump 202 is controlled by the signal from the sensor 214 which causes the power and speed to the front wheel 212 to be increased or decreased depending on the sensed angle. The sensor 214 thereby provides feedback control to optimize the efficiency of the enhancement for driving in soft terrain and on surfaces where the back wheel 14 has a tendency of slipping.

A reservoir 222 supplies hydraulic fluid to the hydraulic pump 122 and a return line 224 from the hydraulic drive 206 returns the hydraulic fluid back to the reservoir 222. A switch 225, which can be mounted in any location on the motorcycle, and typically the handle bars can be manipulated to configure the front wheel drive train 200 to provide an overdrive, an underdrive through manipulation of the hydraulic pump 202 or to provide no power to the front wheel 212 through manipulation of a clutch 230 typically located between the gear box 208 and the front wheel 212. However, other locations of the clutch 230 are also contemplated.

Power is supplied to the hydraulic pump 202 by the output of a transmission from the prime mover or from a battery 232, supported by the motorcycle frame, with wiring 234. It is contemplated that a fuse (not shown) be included in the circuitry to protect both the switch 225 and the hydraulic pump 202 in the event of a failure of the battery 140.

Figure 8:
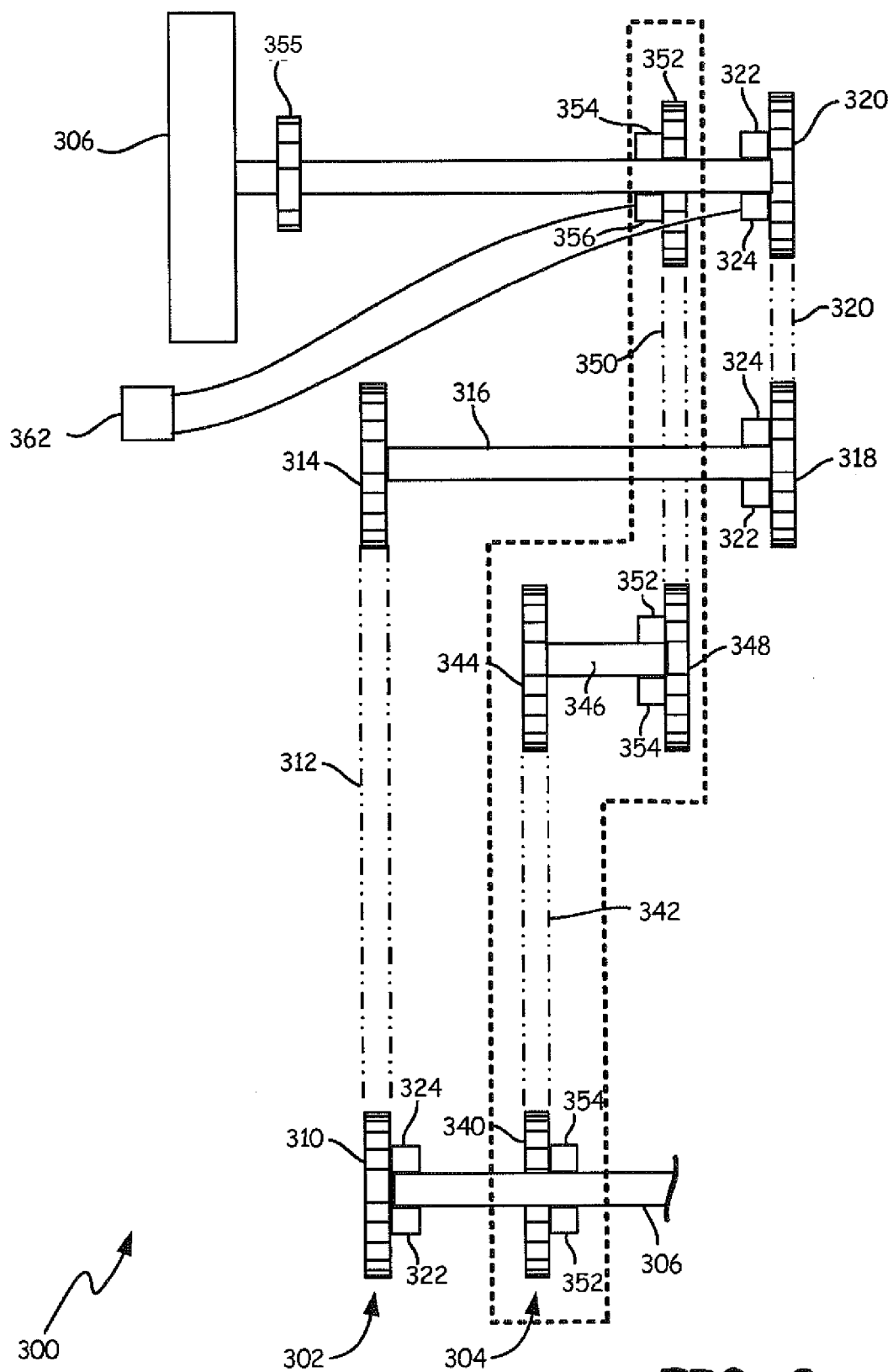
FIG. 8 is a schematic view of parallel front wheel drive trains of the present disclosure.

Referring to FIG. 8 another embodiment of a motorcycle 300 with enhanced soft terrain handling capabilities is illustrated. The embodiment 300 includes a first front wheel drive train 302 and a second front wheel drive train 304. The first front wheel drive train 302 is geared to provide an overdrive to a front wheel 306 in the previously disclosed range of the rate of rotational speed of the front wheel 306 relative to a rate of speed of the rear wheel 14. The second front wheel drive train 204 is configured to provide an underdrive of the front wheel 306 relative to the back wheel in the ratios as previously disclosed.

The first front wheel drive train 302 includes a first drive sprocket 310 attached to an output shaft 308 of the prime mover. A first continuous main drive chain 312 engages the first drive sprocket 310 and a first left front sprocket 314. A first shaft 316 (or two stub shafts connected with a universal joint as previously disclosed) transfers power from the first left front sprocket 314 to a right front sprocket 318. A first continuous drive chain 320 transfers power from the first right front sprocket 318 to a first drive wheel sprocket 320 where the first drive wheel sprocket 320 provides power to the front wheel 306.

A first clutch 322 can be located any of a number of locations 324 on the first front wheel drive train 302. The first clutch 322 can be manipulated to be in an engaged position to provide power to the front wheel 306 or to be in a disengaged position where the first front wheel drive train 302 does not provide power to the front wheel 306.

The second front wheel drive train 304 includes a second drive sprocket 340 attached to an output shaft 308 of the prime mover. A second continuous main drive chain 342 engages the second drive sprocket 340 and a second left front sprocket 344. A second shaft 346 (or two stub shafts connected with a universal joint as previously disclosed) transfers power from the second left front sprocket 344 to a second right front sprocket 348. A second continuous drive chain 350 transfers power from the second right front sprocket 348 to a second drive wheel sprocket 352 where the second drive wheel sprocket 352 provides power to the front wheel 306.

A second clutch 354 can be located any of a number of locations 356 on the second front wheel drive train 304. The second clutch 354 can be manipulated to be in an engaged position to provide power to the front wheel 306 or to be in a disengaged position where the second front wheel drive train 302 does not provide power to the front wheel 306. An overrunning clutch 355 is typically located between the front wheel 306 and the second drive wheel sprocket 352 to allow the front wheel to free wheel when the power to the front wheel 306 is not required, such as when the back wheel 14 has traction and does not slip.

A common switch 362 is coupled to the first and second clutches 322 and 354, respectively, and be positioned into a first position where the first clutch 322 is engaged and the second clutch 354 is disengaged such that an overdrive is provided to the front wheel 306. The switch 362 is positionable into a second position where the second clutch 354 is engaged and the first clutch 322 is disengaged such that an underdrive is provided to the front wheel 306. In a third position, both the first and second clutches 322 and 354, respectively, are disengaged such that the front wheel 306 is freewheeling.

It is also contemplated that the first clutch 322 be manipulated by a first switch and the second clutch be manipulated by a separate and independent second switch 354. However, care must be taken such that both the first and second drive trains 302 and 304 are not engaged at the same time as the first and second drive trains 302 and 304, if simultaneously engaged would fight with each other cause the motorcycle drive train to lock up.

Figure 9:
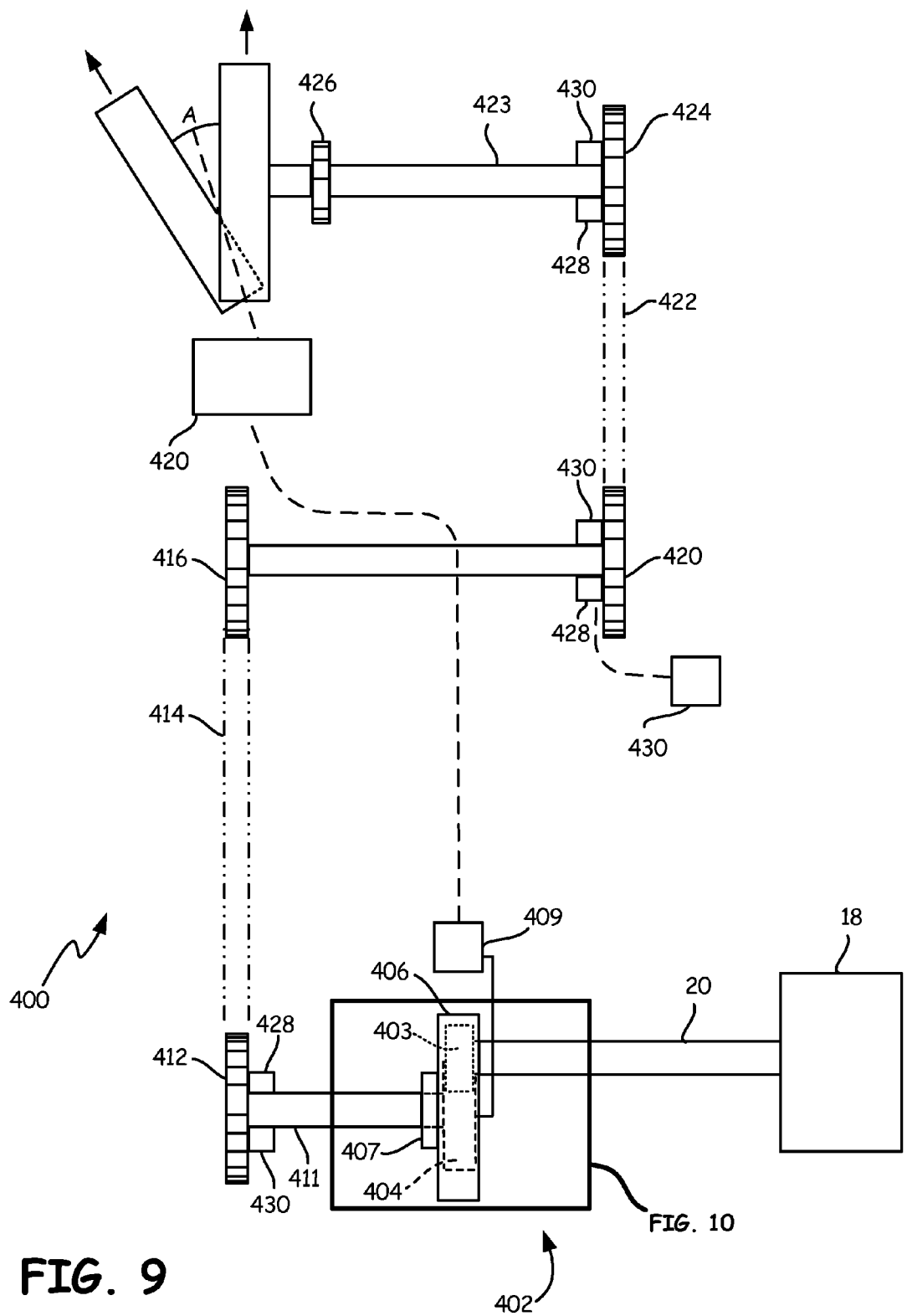
FIG. 9 is a schematic view of a front wheel drive train of the present disclosure with a planetary drive.
Figure 10:
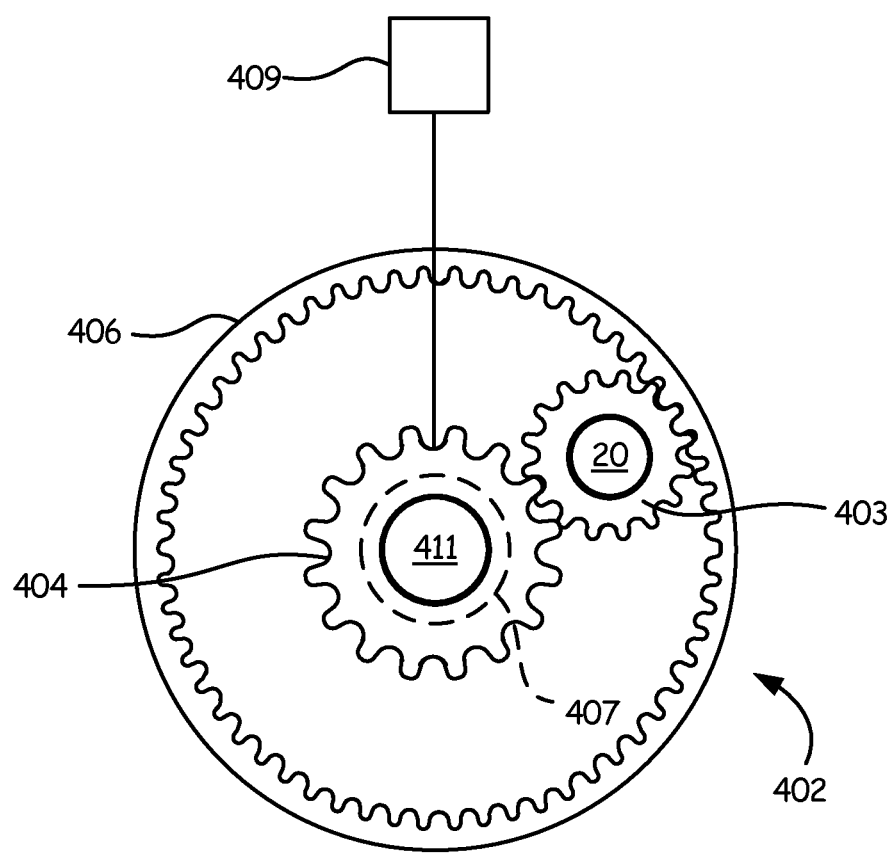
FIG. 10 is a schematic view of a planetary drive for the front wheel drive train as illustrated in FIG. 9.

Referring to FIGS. 9 and 10, another embodiment of a front wheel drive train 400 is illustrated where the front wheel drive train 400 can provide an underdrive or an overdrive in the previously disclosed ranges, respectively. The front wheel drive train 400 includes a planetary drive 402 where power is input to a planet gear 403 through the output shaft 20 of the prime mover 18. Power is then transferred to either a sun gear 404 or a ring gear 406 within an intermediate planet gear 408. The ring gear 406 supplies power to a front wheel 408 utilizing a chain and sprocket drive system.

A drive gear 412 is coupled to an output shaft 411 connected to the ring gear 406. A continuous main drive chain 414 couples the drive gear 412 to a front left sprocket 416. A shaft 418 (or two stub shafts coupled by a universal joint) transfers power to a right front sprocket 420 located at the right side of the motorcycle. A continuous wheel drive chain 422 is coupled to the right front sprocket 420 and a front wheel hub sprocket 424 that is coupled to a hub 423 that is attached to the front wheel 410 and provides power to the front wheel 410. An overrunning clutch 426 is attached between the front wheel hub sprocket 424 and the front wheel 410 to allow the front wheel to free wheel in the event that the front wheel drive train 400 provides an underdrive to the front wheel 410 and the back wheel 14 is not slipping.

A clutch 428 can also be located at a number of locations 430 to selectively engage or disengage the clutch 428 to either provide power to the front wheel 410 or to allow the front wheel 410 to freewheel. A switch 430 is typically located on the motorcycle that controls the configuration of the clutch 428 to either engage or disengage the clutch 428, typically while on the fly or while the motorcycle is moving.

The ring gear 406 and the sun gear 404 are typically coupled with a one way locking mechanism 407, such as a sprag clutch that allows the front wheel drive train 400 to provide an overdrive to the front wheel 410 relative to a back wheel 12 while the sprag clutch 405 free wheels. Alternatively, the sun gear 404 can be controlled by a brake 409, which can cause the sun gear 404 to stop rotating. As a brake 409 is applied to the sun gear 404 and the speed of the sun gear 404 approximate a speed of the ring gear 406, the sprag clutch 405 actives and locks the sun gear 404 and the ring gear 406 such that the front wheel 410 has an underdrive relative to the back wheel 12.

In typical use, the planetary drive 402 provides a slight underdrive with the sun gear 404 locked to the ring gear 406 with the sprag clutch 405. However, when the sun gear 404 is braked, a rotational speed of the ring gear 406 increases and drives the front wheel 410 faster.

Conversely, when the rotation of the sun gear 404 is unimpeded, the sun gear 404 would want to run as fast as possible and not allow the ring gear 406 to provide power to the front wheel 410. However, with the sprag clutch 405 positioned between the sun gear 404 and the ring gear 406, the planetary drive 402 is locked and provides power to the front wheel 410.

Optionally a sensor 420 can be positioned on the motorcycle to detect an angle A the front wheel 410 relative to a direction of travel. The sensor 420 can send a signal to the brake 409 that is coupled to the sun gear 404, to either incrementally release the sun gear 404 which causes the ring gear 46 to rotate at a slower speed which decreases power to the front wheel 410 or alternatively to incrementally engage the brake 409 to cause the rotation of the sun gear 404 to slow which causes the rotational speed of the ring gear 406 to increase which increases the speed of the front wheel 410. As such a feed back control can be provided to the planetary drive 402 to control the power and speed provided to the front wheel 410 based upon the angle A detected by the sensor 420, the value of which is used to manipulate the speed of the sun gear 404 and in turn the rotational speed of the ring gear 406.

Although the present invention has been described with reference to preferred embodiments, workers skilled in the art will recognize that changes may be made in form and detail without departing from the spirit and scope of the invention.

What is claimed is:

1. A motorcycle comprising:
   a frame;
   a front wheel supported by the frame;
   a back wheel supported by the frame;
   a prime mover supported by the frame, the prime mover having an output shaft;
   a back wheel drive train coupled to the output shaft and to the back wheel wherein the back wheel drive train supplies power to the back wheel; and
   a front wheel drive train coupled to the output shaft and to the front wheel, wherein the front wheel drive train is configured to provide power to the front wheel such that a speed of rotation of the front wheel is at a speed faster than a speed of rotation of the back wheel such that the front wheel pulls in a selected direction of travel or is at a speed slower than the speed of rotation of the back wheel and wherein the front wheel drive train comprises:
      at least one clutch, wherein the at least one clutch is configured to be positionable into an engaged position by manipulation by a rider wherein power is supplied to the front wheel and wherein the at least one clutch is configured to be positionable into a disengaged position through manipulation by the rider wherein power is not supplied to the front wheel such that the front wheel is capable of free wheeling.

2. The motorcycle of claim 1 and wherein the speed of rotation of the front wheel is between about 3% and about 8% faster than the speed of the back wheel when the at least one clutch is in the engaged position.

3. The motorcycle of claim 1 and wherein the speed of rotation of the front wheel is between about 5% and about 7% faster than that of the back wheel when the at least one clutch is in the engaged position.

4. The motorcycle of claim 1 and wherein the speed of rotation of the front wheel is up to about 40% faster than that of the back wheel when the at least one clutch is in the engaged position.

5. The motorcycle of claim 1 and wherein the front wheel drive train further comprises an overrunning clutch configured to disengage when the front wheel is turned more than a maximum synchronous steering angle of the front wheel relative to the back wheel when the at least one clutch is in the engaged position such that the front wheel can free wheel.

6. The motorcycle of claim 5 and wherein the overrunning clutch is located between the front wheel and a drive component of the front wheel drive train.

7. The motorcycle of claim 1 and wherein the speed of the front wheel relative to the back wheel is maintained between about 1% and about 10% faster than a synchronous speed of the front wheel and the back wheel.

8. The motorcycle of claim 1 and wherein the speed of the front wheel relative to the back wheel is maintained between about 3% and about 5% faster than a synchronous speed of the front wheel and the back wheel.

9. A motorcycle comprising:
a frame;
a front wheel supported by the frame;
a back wheel supported by the frame;
a prime mover supported by the frame, the prime mover having an output shaft;
a back wheel drive train coupled to the output shaft and to the back wheel wherein the back wheel drive train supplies power to the back wheel; and
a front wheel drive train coupled to the output shaft and to the front wheel, wherein the front wheel drive train comprises a clutch, wherein the clutch is configured to be selectively positionable into an engaged position by manipulation by a rider wherein power is supplied to the front wheel and wherein the clutch is configured to be selectively positionable into a disengaged position through manipulation by the rider wherein power is not supplied to the front wheel such that the front wheel is capable of free wheeling wherein when the clutch is positioned into the engaged position a speed of rotation of the front wheel is faster than a speed of rotation of the back wheel or slower than the speed of rotation of the back wheel.

10. The motorcycle of claim 9 and wherein the speed of rotation of the front wheel is between about 3% and about 8% faster than the speed of the back wheel when the clutch is in the engaged position.

11. The motorcycle of claim 9 and wherein the speed of rotation of the front wheel is between about 5% and about 7% faster than that of the back wheel when the clutch is in the engaged position.

12. The motorcycle of claim 9 and wherein the clutch is selectively positionable between the engaged position and the disengaged position with manual force by the rider.

13. The motorcycle of claim 9 and further comprising:
an actuator configured to move the clutch between the engaged position and the disengaged position based upon manipulation by the rider; and
a controlled communication with the actuator and configured to cause the actuator to move the clutch between the engaged position and the disengaged position.

14. A motorcycle comprising:
a frame;
a front wheel supported by the frame;
a back wheel supported by the frame;
a prime mover supported by the frame, the prime mover having an output shaft;
a back wheel drive train coupled to the output shaft and to the back wheel wherein the back wheel drive train supplies power to the back wheel;
a front wheel drive train coupled to the output shaft and to the front wheel, wherein the front wheel drive train comprises a first clutch, wherein the first clutch is configured to be selectively positionable into an engaged position by manipulation by a rider wherein power is supplied to the front wheel and wherein the first clutch is configured to be selectively positionable into a disengaged position through manipulation by the rider wherein power is not supplied to the front wheel such that the front wheel is capable of free wheeling; and
an overrunning clutch configured to disengage when the front wheel is turned more than a maximum synchronous steering angle of the front wheel relative to the back wheel when the first clutch is in the engaged position such that the front wheel can free wheel.

15. The motorcycle of claim 14 wherein the speed of rotation of the front wheel is between about 3% and about 8% faster than the speed of the back wheel when the first clutch is in the engaged position.

16. The motorcycle of claim 14 and wherein the speed of rotation of the front wheel is between about 5% and about 7% faster than that of the back wheel when the first clutch is in the engaged position.

17. The motorcycle of claim 14 and wherein the overrunning clutch is located between the front wheel and a drive component of the front wheel drive train.

18. The motorcycle of claim 14 and wherein the speed of the front wheel relative to the back wheel is maintained between about 1% and about 10% faster than a synchronous speed of the front wheel and the back wheel.

19. The motorcycle of claim 14 and wherein the speed of the front wheel relative to the back wheel is maintained between about 3% and about 5% faster than a synchronous speed of the front wheel and the back wheel.

20. The motorcycle of claim 14 and wherein the speed of rotation of the front wheel is up to about 40% faster than that of the back wheel when the first clutch is in the engaged position.

* * * * *